L. NAGEL.
FASTENER FOR CORRUGATED IRON SHEETS AND THE LIKE.
APPLICATION FILED DEC. 20, 1913.
1,102,068.
Patented June 30, 1914.
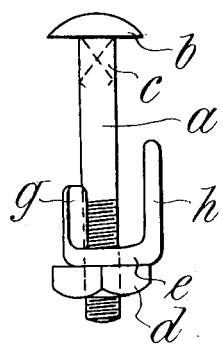
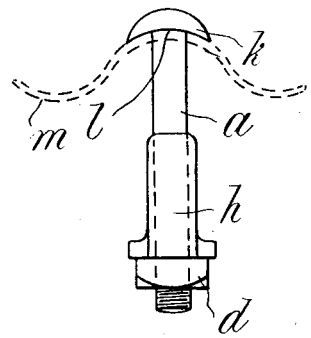
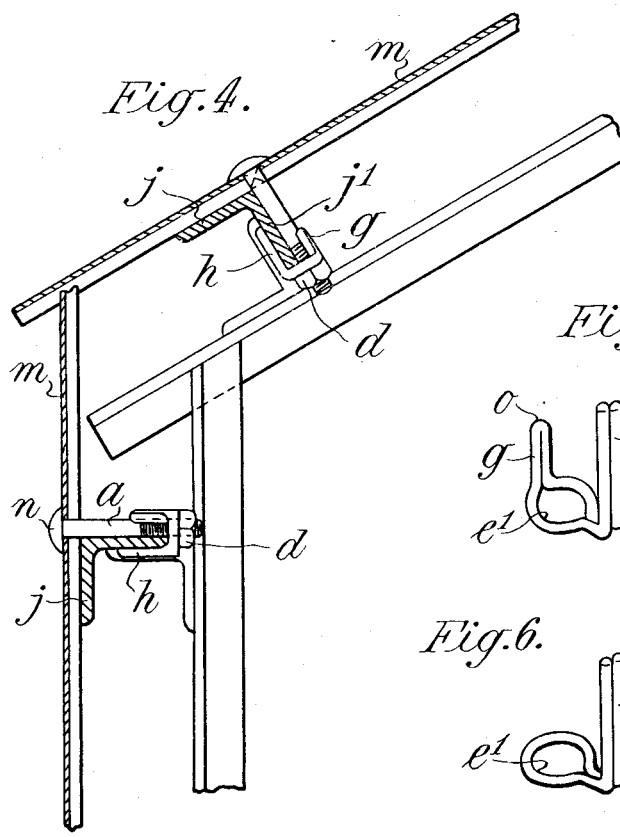
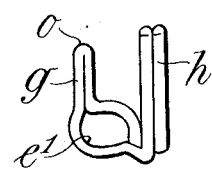
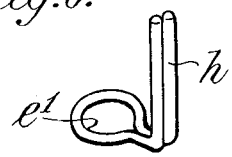
L. Nagel, Inventor

UNITED STATES PATENT OFFICE.

LUDWIG NAGEL, OF HACKNEY, LONDON, ENGLAND.

FASTENER FOR CORRUGATED IRON SHEETS AND THE LIKE.

1,102,068.  Specification of Letters Patent.  Patented June 30, 1914.

Application filed December 20, 1913. Serial No. 808,039.

*To all whom it may concern:*

Be it known that I, LUDWIG NAGEL, a subject of the Emperor of Germany, residing at 86 Amhurst road, Hackney, in the county of London, Kingdom of England, have invented certain new and useful Improvements in or Relating to Fasteners for Corrugated-Iron Sheets and the like, of which the following is a specification.

This invention relates to fasteners for securing corrugated iron sheets or the like to angle iron framework of the kind in which a bolt having a spherical head is inserted through a hole in the corrugated iron, a washer or clip adapted to screw or slide onto the screwed end of the bolt, so shaped as to hook over and fit to one edge of the angle or other shaped iron forming the framework of the inside of the building and a nut adapted to be screwed on the said screwed end of the bolt. In the above described device it has been proposed to form a screw driver slot in the spherical head thus enabling the bolt to be withdrawn by unauthorized persons.

The primary object of my invention is to positively prevent turning and such withdrawal of the bolt from the outside and for this purpose the bolt is formed with a plain spherical head and also with a squared shank or the under surface of the head may be recessed or concaved. In some cases the bolt is formed with a square or other projection below the head to prevent turning when tightening up. The washer for use with the above described bolt is preferably provided with two up-turned flanges or projections opposite one another in the line of the diameter of the washer. These projections are bent up at right angles to the washer, one projection is bent up alongside of the bolt and curved to conform with the shank of the bolt, the other projection is spaced a distance away from the bolt, and is preferably rectangular in plan.

Referring to the drawings:—Figure 1 is an elevation of the improved hook fastening, Fig. 2 is a plan of the washer, Fig. 3 is a similar view to Fig. 1 of a modification, Fig. 4 is a part section of an iron building showing the hook fastener in use, and Figs. 5 and 6 show in perspective two modified forms of washer, each made of a single length of wire.

The bolt *a* having a plain spherical head *b* is provided with a squared portion *c* below the head, for preventing its rotation when in place, and with a nut *d* in the usual manner. Slidably mounted on the bolt is a washer *e* formed with two projections or flanges *g h* at right angles to the said washer. The projection *g* has a curved inner face *g'* adapted to engage the shank of the bolt thereby keeping the other projection in parallel alinement with the said bolt. This other projection *h* is preferably formed rectangular in plan extending for a considerable distance parallel to and at a distance away from the shank of the bolt *a* and is adapted to engage the projecting flange *j'* of an angle iron or other section *j* of the framework generally used in the construction of corrugated iron buildings.

In the modification shown in Fig. 3 the under part of the head *k* is recessed or concaved as at *l* to conform with the contour of the corrugated iron, to prevent the bolt from turning when tightening up, and unscrewing of the same from the outside, and also to provide a closer fit for the head, thus preventing gaps at the sides which would otherwise occur with a bolt having a flat face under the head. The square part under the head could in this case be dispensed with.

In the modification shown in Fig. 5 the washer and projections are formed of a single wire bent upon itself at about the middle of its length at *o* to form the projection *g*, then bent at right angles and each end curved outward and inward to form an eye *e'* for the reception of the shank of the bolt. The double wire is again bent at right angles to form the other projection *h* at a distance from the curved portion to allow room for the flange of the before-mentioned angle iron.

Fig. 6 shows a similar method of forming a washer having a single projection *h*.

The respective parts of my improved fastener may be galvanized or otherwise coated to prevent rusting. In use holes are drilled or punched in the corrugated iron sheets *m* Fig. 4 and the bolts *a* are inserted butting against one side *j'* of the L section *j* of the framework. The washer is placed on the bolt and the longer projection *h* butts against the other side of the flange *j'*. The nut is then screwed up thus securing the corrugated iron to the angle iron in such a manner that it is impossible to remove the sheets from the outside. When the fastening is used for the side of a building, india rubber or composition washers $n$ may be used under the heads of the bolts, and in roofing the bolt is preferably used on the elevated part of the corrugated sheets. Owing to the head of the bolt projecting very little above the iron, the rounded head would offer very little obstruction to a mass of slipping snow on a roof.

What I claim as my invention and desire to secure by Letters Patent of the United States is:—

1. In combination, a threaded bolt having a head, a washer on the bolt, said washer having a short lug curved on its inner face to receive the bolt, and a long lug which is spaced from the bolt and extends beyond the short lug, and a nut engaging the threads of the bolt to hold the washer in place.

2. In combination, a threaded bolt having a head, a washer on the bolt, said washer having a lug extending parallel with the bolt and spaced from the latter, means for preventing the washer turning on the bolt, and a nut engaging the threads of the bolt to hold the washer in place.

3. In combination, a threaded bolt having a head, a washer formed from a single piece of metal and bent to provide a circular portion, and two lugs of different lengths extending upwardly therefrom, the shorter one of said lugs fitting snugly the bolt and the longer one of said lugs being spaced from and extending beyond the short lug and parallel therewith.

In testimony whereof I have signed this specification in the presence of two subscribing witnesses.

LUDWIG NAGEL.

Witnesses:
 N. ARTHER,
 FRANK BLAKEY.